United States Patent
Nees et al.

(10) Patent No.: US 6,915,617 B2
(45) Date of Patent: Jul. 12, 2005

(54) VARIABLE THICKNESS TUBULAR DOORBEAM

(75) Inventors: Rainer B. Nees, Brighton, MI (US); Melvin J. Guiles, West Olive, MI (US)

(73) Assignee: Shape Corporation, Grand Haven, MI (US)

(*) Notice: Subject to any disclaimer, the term of this patent is extended or adjusted under 35 U.S.C. 154(b) by 0 days.

(21) Appl. No.: 10/761,447

(22) Filed: Jan. 20, 2004

(65) Prior Publication Data

US 2004/0148905 A1 Aug. 5, 2004

Related U.S. Application Data

(63) Continuation of application No. 10/010,133, filed on Dec. 6, 2001, now Pat. No. 6,722,037.

(51) Int. Cl.[7] .............................. E04C 3/00; B60J 5/00
(52) U.S. Cl. ..................... 52/735.1; 52/731.6; 296/202; 296/205; 280/786; 280/796
(58) Field of Search ........................... 52/731.6, 732.1, 52/735.1, 731.2, 745.19; 29/897.2, 897.31, 897.312, 798.35; 138/142, 143, 151, 156, 171, 172, 177; 296/202, 205, 188; 280/786, 796

(56) References Cited

U.S. PATENT DOCUMENTS

| | | | | |
|---|---|---|---|---|
| 1,611,715 A | * | 12/1926 | Bonsall | |
| 2,085,829 A | * | 7/1937 | Rogers | |
| 2,406,838 A | * | 9/1946 | Kepler | |
| 3,095,083 A | * | 6/1963 | Helble et al. | |
| 5,040,399 A | * | 8/1991 | Knapper et al. | |
| 5,046,777 A | * | 9/1991 | Garnweidner et al. | |
| 5,124,186 A | | 6/1992 | Wycech | |
| 5,255,487 A | | 10/1993 | Wieting et al. | |
| 5,277,469 A | | 1/1994 | Klippel | |
| 5,494,209 A | * | 2/1996 | Randlett et al. | 288/147 |
| 5,540,016 A | | 7/1996 | Clausen | |
| 5,557,961 A | * | 9/1996 | Ni et al. | |
| 5,669,440 A | * | 9/1997 | Bauer et al. | |
| 5,756,167 A | | 5/1998 | Tamura et al. | |
| 5,785,376 A | * | 7/1998 | Nees et al. | |
| 5,820,202 A | | 10/1998 | Ju | |
| 5,884,960 A | | 3/1999 | Wycech | |
| 5,926,930 A | | 7/1999 | Tamura et al. | |
| 5,996,645 A | * | 12/1999 | Hosokawa et al. | |
| 6,020,039 A | * | 2/2000 | Cline et al. | 428/36.9 |
| 6,050,049 A | * | 4/2000 | Kowallski et al. | 52/731.6 |
| 6,082,811 A | * | 7/2000 | Yoshida | 296/188 |
| 6,098,262 A | * | 8/2000 | Thoms et al. | |
| 6,168,226 B1 | | 1/2001 | Wycech | |
| 6,332,302 B1 | | 12/2001 | Asai | |
| 6,390,534 B1 | * | 5/2002 | Lee et al. | 296/146.6 |
| 6,408,591 B1 | * | 6/2002 | Yamashita et al. | 52/731.6 |
| 6,539,604 B2 | * | 4/2003 | Patelczyk | |
| 6,722,037 B2 | * | 4/2004 | Nees et al. | 29/897.2 |

FOREIGN PATENT DOCUMENTS

| | | | |
|---|---|---|---|
| DE | 19640568 | 4/1998 | |
| DE | 19756459 | 6/1999 | |
| EP | 0952020 | 10/1999 | |
| JP | 404092719 A | * 3/1992 | .............. B60J/5/04 |
| JP | 5-38992 | * 2/1993 | ........... B60R/21/02 |
| JP | 5-42823 | * 2/1993 | .............. B60J/5/04 |
| JP | 5-345519 | * 12/1993 | .............. B60J/5/04 |
| JP | 1191352 | 4/1999 | |

OTHER PUBLICATIONS

English language translation of German Patent 19640568.

* cited by examiner

*Primary Examiner*—Robert Canfield
(74) *Attorney, Agent, or Firm*—Warner Norcross & Judd

(57) ABSTRACT

A method of manufacturing an improved doorbeam having increased impact strength and reduced weight. The doorbeam is formed from a continuous metal web having opposing lateral edges and a varying thickness therebetween. The stock is rolled into a tubular configuration, and the lateral edges are welded together. The resultant beam provides extra reinforcing material where needed to provide a balance between weight and strength.

6 Claims, 4 Drawing Sheets

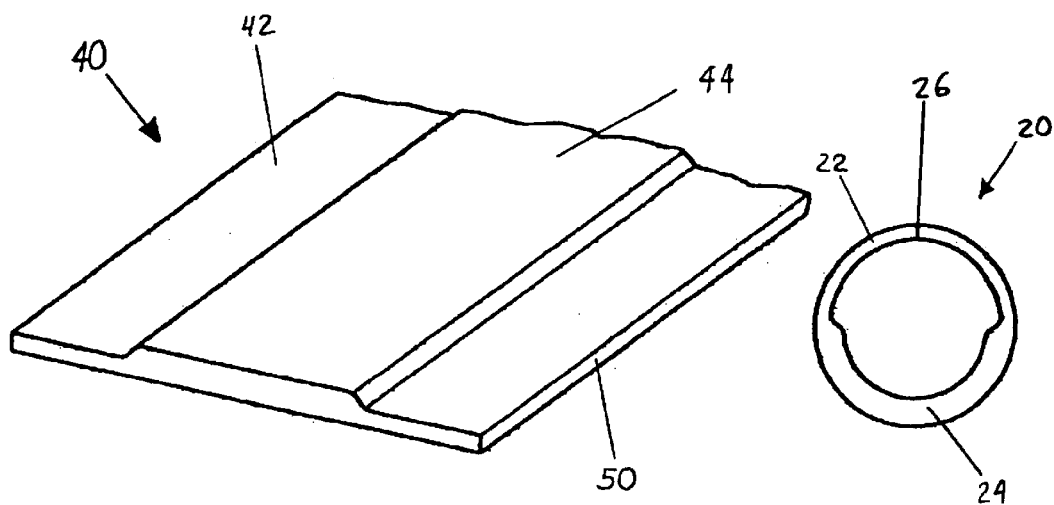
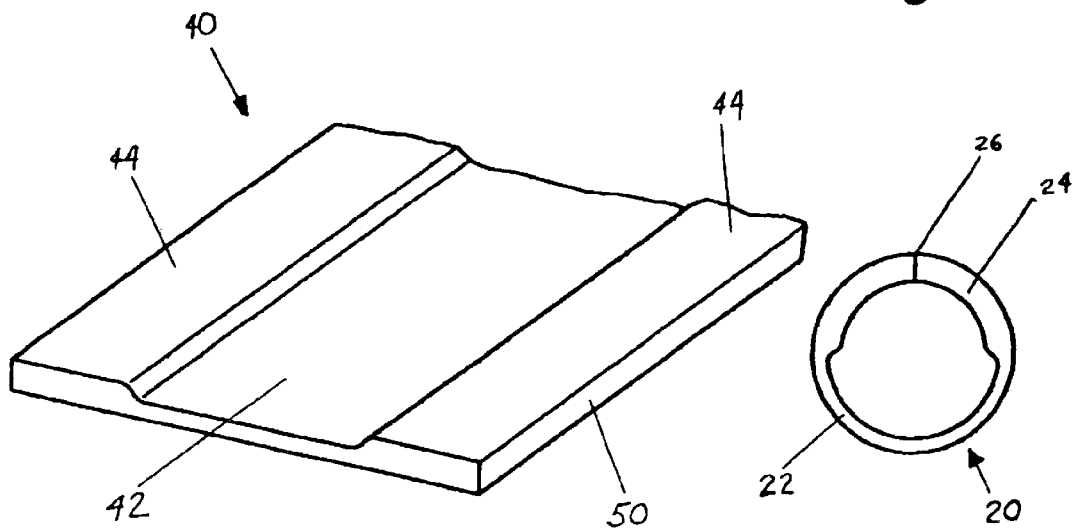

VARIABLE THICKNESS TUBULAR DOORBEAM

This application is a continuation of application Ser. No. 10/010,133 filed Dec. 6, 2001 which issued as U.S. Pat. No. 6,722,037.

BACKGROUND OF THE INVENTION

I. Field of the Invention

The present invention relates to vehicle doorbeams.

II. Description of the Art

Vehicle doorbeams are widely used in the automotive industry to enhance the impact strength of vehicle doors and thereby enhance safety. Vehicle manufacturers desire to make vehicles safer for passengers and to improve fuel efficiency. Therefore, doorbeams must strike a balance between strength to resist impacts and reduced weight to increase fuel efficiency.

One method to increase the strength of the beam is to increase the thickness of the material from which the beam is fabricated. This improves passenger safety but also increases the weight of the beam, thereby decreasing fuel efficiency.

Another technique for increasing beam strength is to add extra reinforcing pieces of metal to the doorbeam as illustrated in U.S. Pat. No. 5,277,469 issued Jan. 11, 1994 to Klippel. These reinforcements add weight to the beam. The reinforcements also increase the complexity, cost, and required labor to fabricate the beam.

Another technique for increasing beam strength is to make the doorbeam out of lightweight, high-strength alloys. While the alloys are relatively lightweight, they are expensive to manufacture. Another technique for increasing beam strength is to fabricate the entire beam of a lightweight material, such as aluminum, with a relatively thick cross section and wall thickness. This approach eliminates most of the weight savings. These beams are also difficult and expensive to manufacture, difficult to adapt between different doors, and hard to fit within narrow profile doors.

Other methods include fabricating the doorbeam with special geometric cross sections such as trapezoids and ellipses as seen in U.S. Pat. No. 6,020,039 issued Feb. 1, 2000, to Cline et al. Other beams are filled with a composite material in an attempt to improve impact strength. All these beams are difficult, expensive and time consuming to manufacture. They are also difficult to adapt among various doors on different makes and models of vehicles.

SUMMARY OF THE INVENTION

The aforementioned problems are overcome in the present application wherein a one-piece doorbeam is rollformed from a continuous web of stock having a varying thickness profile across its lateral extent. More specifically, a web has stock at least two different thicknesses across its width; and the web is rolled into a tubular shape and welded along the resulting seam.

The present invention has a variety of advantages over prior techniques. First, the beam provides thicker walls where needed to increase passenger safety and thinner walls elsewhere to save weight. Second, the complete beam may be fabricated as a single piece without additional pieces, expensive alloys, composite fillers or unusual cross sections. Consequently, the beam is relatively labor-efficient and inexpensive, while providing the necessary strength and desired weight. The beam is also easily adaptable between vehicles by changing the overall length of the resultant rollformed segments.

These and other objects, advantages and features of the invention will be more fully understood and appreciated by reference to the detailed description of the preferred embodiments and the drawings.

BRIEF DESCRIPTION OF THE DRAWINGS

FIG. 2 is a perspective view of the web stock used in fabricating the doorbeam;

FIG. 3 is a sectional view of a doorbeam formed from the web stock in FIG. 2;

FIG. 4 is a perspective view of an alternative web stock used in fabricating an alternative doorbeam;

FIG. 5 is a sectional view of the alternative doorbeam formed from the web stock in FIG. 4;

DETAILED DESCRIPTION

Figure 1:
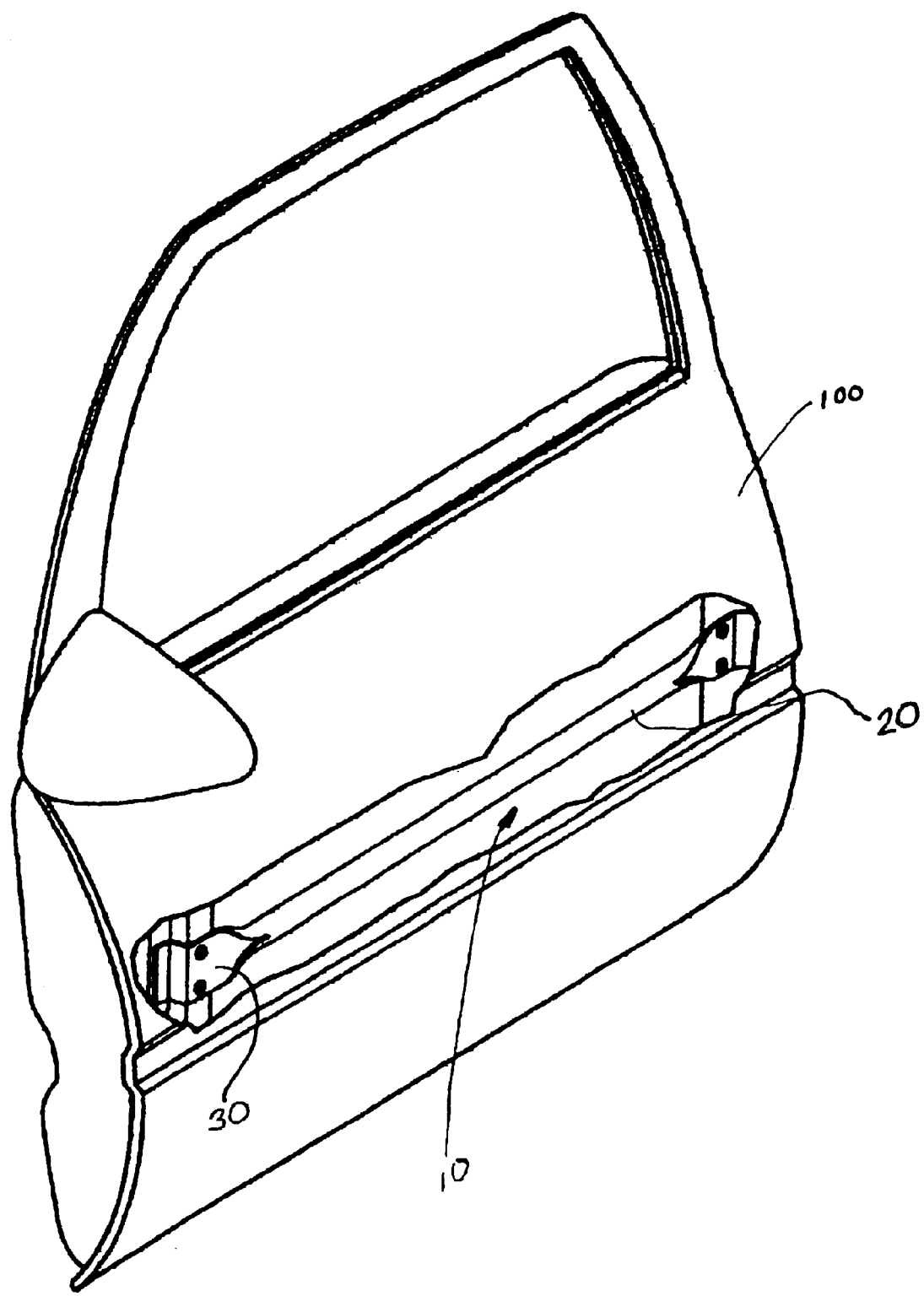
FIG. 1 is a perspective view, partially broken away, of the doorbeam mounted within a door.

By way of disclosure, and not by way of limitation, a tubular doorbeam constructed in accordance with a preferred embodiment of this invention is illustrated in FIGS. 1–3 and generally designated 10.

I. Construction of Doorbeam

The doorbeam 10 is formed from a web stock 40 and generally includes a center section 20 and attachment portions or end portions 30. The center section 20 interconnects the end portions 30, which secure the doorbeam 10 in a door 100, as shown in FIG. 1.

The web stock 40 includes opposing lateral edges 50, as illustrated in FIGS. 2 and 4. In the preferred embodiment, the web stock 40 is formed from a martinsitic steel (i.e. Martinsite) such as Inland M220 ultra high strength low alloy steel. Of course, other materials that have the suitable properties for the performance requirements of a doorbeam may be used. The edges 50 are generally linear and uniformly spaced from one another, allowing the web stock 40 to have a uniform width. The web stock 40 may include a varying thickness profile, but will be described in relation to the preferred embodiment with the web stock 40 having a first and second thicknesses 42 and 44, although in some embodiments, more than two thicknesses may be used (not illustrated). The location of the first and second thicknesses 42 and 44 may vary, but in the preferred embodiment, the second thickness 44 is approximately centered between the edges 50 as illustrated in FIG. 2. The thickness profile between the first and second thickness 42 and 44 may change abruptly or gradually. The type of change may depend on the location of the first and second thickness 42 and 44. The type of change also may be chosen to ensure that the beam is no thicker at any given point than required, thereby allowing for the optimal balance of weight and impact strength.

The web stock 40 is rolled into a tubular shape, and formed into a doorbeam 10. A cross section of the tubular shape generally includes a varying thickness circumferential profile, relatively proportional to the varying thickness profile of the web stock 40, rolled into the tubular shape.

The web stock 40 is generally rolled into a continuous tubular shape that is then formed into the doorbeam 10. The beam 10 generally includes a center section 20 and end portions 30. In some embodiments, the beam 10 may be formed without the end portions.

The formed center section 20 includes a first thickness 22, the second thickness 24, and a seam 26. The first thickness 22 and second thickness 24 are the first thickness 42 and second thickness 44 of the web stock 40 rolled into the tubular shape. The first thickness 22 and second thickness 24 are illustrated in FIGS. 3 and 5 as being located approximately opposite on the doorbeam 10, but may be located almost anywhere on the beam, with varying thickness. The location of the thicknesses depends on the location of the thicknesses on the web stock 40. Of course any third thickness and/or an additional second thickness on the web stock will show up proportionately on the beam 10.

The seam 26 may be located anywhere on the beam 10 but for ease of manufacture is preferably located as shown in FIGS. 3 and 5, approximately in the middle of the first or second thickness 22 and 24. In the preferred embodiment, the seam 26 is a weld sean.

The end portions 30 are usually brackets formed from the ends of the center section 20. The end portions 30 are generally well known in the art and may be formed to any shape or size to attach to a variety of doors 100. The beam 100 may also be formed without end brackets (not illustrated), for example, as an elongate center section 20 that is attached to a door 100 by clamp, fastener, weld, or other means. For ease of manufacture, the end portions 30 may also include the varying thickness. The thickness variations may also increase the strength of the end brackets 30 while saving weight.

II. Method of Manufacture

The doorbeam 10 starts out as a web stock 40 that includes a first and second thickness 42 and 44 as may be seen in FIGS. 2 and 4. In the preferred embodiment, the first and second thicknesses 42 and 44 are formed while the web stock 40 is formed. Of course, the first and second thickness 42 and 44 may be formed at any other time before the web stock 40 is enclosed upon itself into the tubular shape. The first and second thickness 42 and 44 may be formed by rolling, stamping, or any other process. In the preferred embodiment, the web stock 40 is formed from continuous web stock 40 into a continuous beam, cut to length, and formed into individual doorbeams 10. A continuous web stock 40 may also be formed into individual metal blanks (not shown) and then formed into the doorbeam 10 or the web stock may be made as individual metal blanks that are formed into the doorbeam 10.

The beam 10 is then welded along the seam 26. The preferred welder is a laser welder to obtain high weld quality, but any other suitable welding technique may be used. Either before or after the beam is welded, the end brackets 30 are formed. The method of forming end brackets is well known in the art. The end brackets 30 may also be attached by welding, fasteners, or any other means.

III. Alternative Embodiments

FIGS. 4 and 5 show a first alternative embodiment of the web stock 40, and a sectional view of the doorbeam 10. In this alternative embodiment, the web stock 40 is formed having a greater thickness near the lateral edges 50, than the center. Therefore, the seam 26 is along the area of greater thickness.

Figures 6, 7:
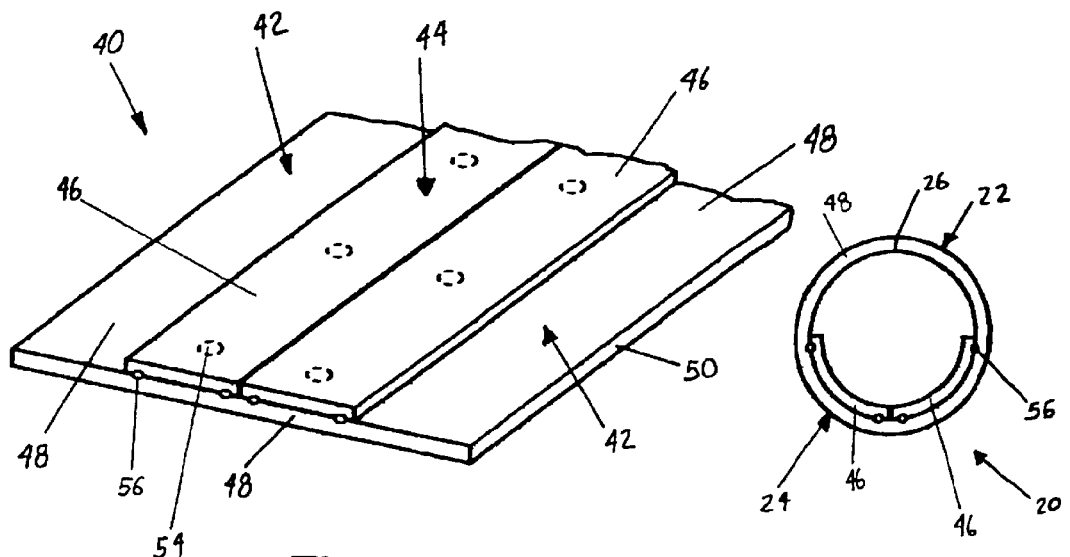
FIG. 6 is a perspective view of a second alternative web stock used in fabricating a second alternative doorbeam.
FIG. 7 is a sectional view of the second alternative doorbeam formed from the metal stock in FIG. 6.

FIGS. 6 and 7 show a second alternative embodiment of the doorbeam 10. In this alternative embodiment, the web stock 40 includes a base stock 48 with at least one metal strip 46 attached approximately in the center of the base stock 48. The base stock 48 forms the first thickness 42. The combination of the metal strip 46 and the base stock 48 form the second thickness 44. In the preferred embodiment, the metal strip 46 is attached to the base stock 48 by welding. The methods of welding may include, laser, resistance, electron beam, or any other suitable welding means to attach the metal strip or strips 46 to the base stock 48. Additional spot welds 54 may be added to further secure the metal strips 46, as may be seen in FIGS. 6 and 8.

Figures 8, 9:
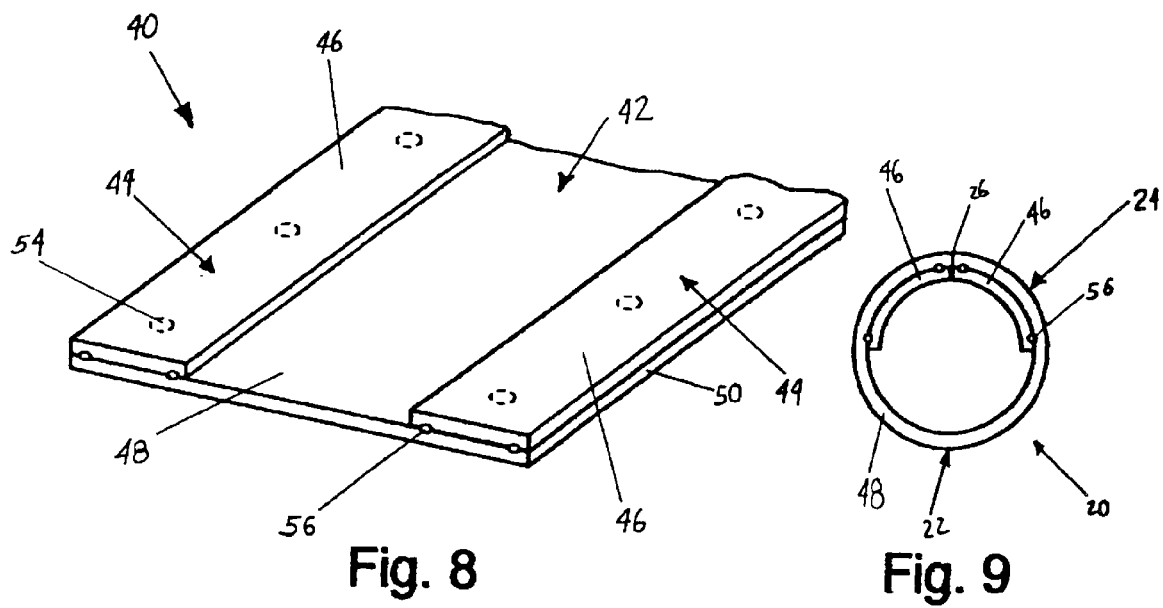
FIG. 8 is a perspective view of a third alternative web stock used in fabricating a third alternative doorbeam.
FIG. 9 is an end view of the third alternative doorbeam formed from the metal stock in FIG. 8.

FIGS. 8 and 9 show a third alternative embodiment of the doorbeam 10. The third alternative embodiment is similar to the second alternative embodiment, except that the metal strips 46 are located near each of the lateral edges 50. Of course, it should be apparent that the metal strips 46 may be located anywhere on the base stock 48. The actual placement of the metal strips 46 is not critical, so long as when the beam 10 is added to the door 100, the areas needing extra thickness are somewhat positioned to provide maximum strength against impacts. This positioning may also be set when the end brackets 30 are formed, or when the beam is installed into the door 100.

Figure 10:
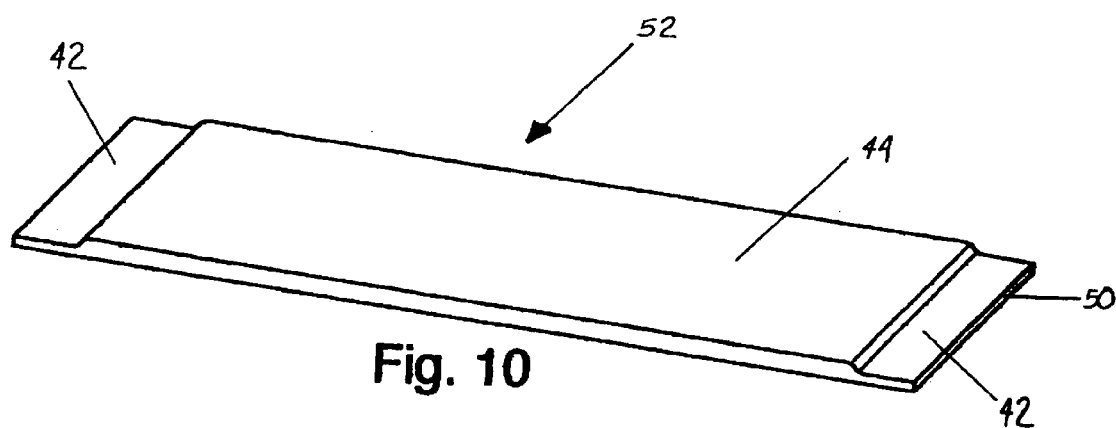
FIG. 10 is a perspective view of a fourth alternative web stock used in fabricating a fourth alternative doorbeam.
Figure 11:
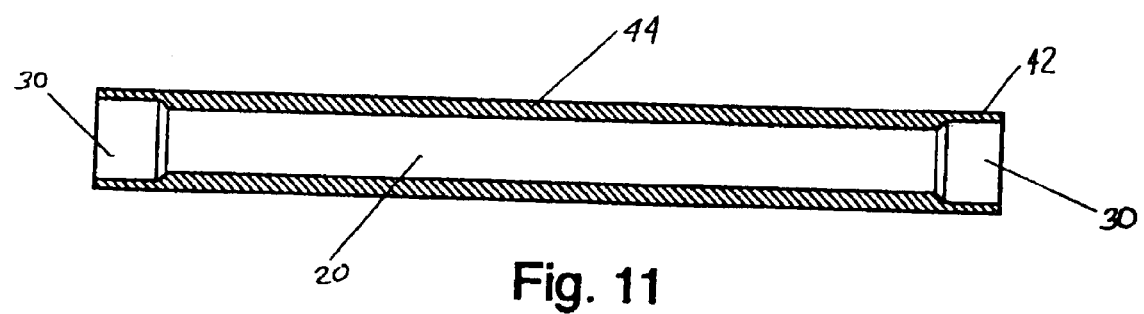
FIG. 11 is a longitudinal sectional view of a tubular beam formed from the web stock in FIG. 10.

FIGS. 10 and 11 show a fourth alternative embodiment of the doorbeam 10. In the fourth alternative embodiment a doorbeam 10 is formed with a high strength center portion 20 and lightweight end portions 30, as seen in FIG. 11. The web stock 40 is formed as discussed above with the preferred embodiment. One difference is that the web stock 40 in the fourth alternative embodiment has a much greater distance between the opposing lateral edges than in the preferred embodiment. The web stock 40 is cut into metal blanks 52, approximately perpendicular to the opposing lateral edges 50. The width of a metal blank 52 is approximately the circumference of the center section 20 of the doorbeam 10. The length of the doorbeam 10 is approximately the width between the lateral edges 50 of the web stock 40. The web stock 40 is rolled into a doorbeam as shown in FIG. 11.

Variations of the fourth alternative embodiment should be readily apparent. For example, varying the proportions of the first and second thicknesses 42 and 44 on the web stock 40 may easily change the proportions of the center section 20 and end brackets 30. Also, if the web stock 40 is formed as in the second alternative embodiment, with the second thickness 44 located near the edges 50 and the first thickness 42 located near the center, the beam 10 may be formed with a lightweight center portion 30 and high strength end portions 30.

The present invention can be used to create a wide and indeed limitless variety of light-weight, yet high-strength tubular doorbeams 10, reinforced only as needed for a balance of strength and weight. The present invention results in an improved doorbeam 10 that is manufactured at a lower cost with increased impact strength and decreased weight.

The above descriptions are those of preferred embodiments of the invention. Various alterations and changes can be made without departing from the spirit and broader aspects of the invention as defined in the appended claims, which are to be interpreted in accordance with the principles of patent law, including the doctrine of equivalents.

The embodiments of the invention in which an exclusive property or privilege is claimed are defined as follows:

1. A one-piece vehicle doorbeam comprising:

a deformable web closed upon itself into a tube having a cross section, a first portion of said cross section having a first thickness, a second portion of said cross section having a second thickness different from said first thickness; and attachment portions integral with said tube and extending from opposite ends of said tube and adapted to attach said doorbeam to a vehicle door.

2. The doorbeam of claim 1 wherein said deformable web includes opposing lateral edges, said lateral edges joined on said tube forming a seam.

3. The doorbeam of claim 2 wherein said seam is a weld.

4. A one-piece vehicle doorbeam comprising:

a deformable web closed on itself to form a generally circular tube including first and second circumferential portions having different thicknesses, said tube having an inner surface and an outer surface, said outer surface being generally circular in cross section, said inner surface being generally noncircular in cross section; and attachment portions integral with said tube and extending from opposite ends of said tube, said end portions adapted to attach the vehicle doorbeam to a vehicle door.

5. The vehicle doorbeam of claim 4 wherein said deformable web includes lateral edges, said lateral edges being joined.

6. The vehicle doorbeam of claim 5 wherein said joined lateral edges are welded.

* * * * *